US008570570B2

(12) United States Patent
Kuwasaki

(10) Patent No.: US 8,570,570 B2
(45) Date of Patent: Oct. 29, 2013

(54) IMAGE FORMING APPARATUS, FILE DELIVERY SYSTEM, AND FILE DELIVERY METHOD THAT MAY EASILY ASSOCIATE A META DATA FILE WITH AN IMAGE DATA FILE IN UNITS OF A PAGE, EASILY CONFIRM THE FINAL PAGE IN THE IMAGE DATA FILE, AND RAPIDLY DELIVER THE IMAGE DATA FILES

(75) Inventor: Naoki Kuwasaki, Osaka (JP)

(73) Assignee: KYOCERA Document Solutions Inc. (JP)

( * ) Notice: Subject to any disclaimer, the term of this patent is extended or adjusted under 35 U.S.C. 154(b) by 349 days.

(21) Appl. No.: 13/094,297

(22) Filed: Apr. 26, 2011

(65) Prior Publication Data
US 2011/0261416 A1    Oct. 27, 2011

(30) Foreign Application Priority Data

Apr. 27, 2010   (JP) .................... 2010-102118

(51) Int. Cl.
*G06F 3/12*     (2006.01)
*G06F 17/00*    (2006.01)
*G06F 3/00*     (2006.01)
*G06F 3/048*    (2013.01)
*H04N 1/00*     (2006.01)
*H04N 1/04*     (2006.01)

(52) U.S. Cl.
USPC .......... 358/1.15; 358/408; 358/474; 358/476; 715/200; 715/748; 715/769

(58) Field of Classification Search
USPC ........ 358/1.15, 442, 400, 405, 408, 425, 474, 358/487, 476; 707/825, 616, 737, 771, 821, 707/822, 826, 827; 726/2, 3, 99, 101, 93; 715/200, 248, 714, 734, 748, 749, 760, 715/769
See application file for complete search history.

(56) References Cited

U.S. PATENT DOCUMENTS

| | | | |
|---|---|---|---|
| 2003/0233363 A1* | 12/2003 | Cohen et al. .................. | 707/100 |
| 2004/0015536 A1* | 1/2004 | Cohen et al. .................. | 709/200 |
| 2004/0034849 A1* | 2/2004 | Cohen et al. .................. | 717/120 |
| 2004/0123131 A1* | 6/2004 | Zacks et al. ................... | 713/200 |
| 2011/0040813 A1 | 2/2011 | Oue et al. | |

FOREIGN PATENT DOCUMENTS

JP    2010-045785    2/2010

OTHER PUBLICATIONS

Masumoto Benko et al., Image Forming Device, Translation of Japanese Patent Application Publication, JP2010045785, All Pages.*

* cited by examiner

*Primary Examiner* — Ngon Nguyen
(74) *Attorney, Agent, or Firm* — McDonnell Boehnen Hulbert & Berghoff LLP

(57) ABSTRACT

An image forming apparatus includes an image scanning unit, a metafile creating unit, a transmission file name creating unit, and a control unit. The metafile creating unit creates a first metadata file and a second metadata file. The control unit transmits image data files in units of a page, created by the image scanning unit, after transmitting the first metadata file to the file delivery apparatus. The control unit transmits the second metadata file after transmitting the image data files (in a unit comprising all the pages) to the file delivery apparatus. The control unit provides a transmission file name (including a common part created by the transmission file name creating unit) to the first meta data file, the image data file, and the second meta data file.

20 Claims, 7 Drawing Sheets

```
<meta_start>
  <device_info>
    <model_name>TASKalfa 300ci</model_name>
    <ip_address>10.181.56.214</ip_address>
    <host_name>KM6235</host_name>
    <mac_address>32:61:3C:4E:B6:83</mac_address>
  <device_info>
  <user_info>
    <group_id>First Design Group</group_id>
    <user_id>Taro.Yamada</user_id>
  </user_info>
  <keywords>
    <keyword>design</keyword>
  </keywords>
</meta_start>
```

2021

```
<meta_end>
  <job_info>
    <job_id>9999</job_id>
    <scan_result>SCAN_COMPLETED</scan_result>
  </job_info>
</meta_end>
```

| DELIVERY CONDITION | DELIVERY DESTINATION ADDRESS | FILE NAME CHANGE | FILE DELIVERY TIME |
|---|---|---|---|
| [KW=consultation]AND[KW=1000~15000] | A, B, C | | |
| [UID=Shizue]AND[KW=purchase order memo]AND[KW=general affairs section] | D | | Every Day 10:00 |
| | E | purchase order [Count] | |
| [KW=???-???-????] | F | FAX[Now] | |
| [UID=Hanako]AND[MID=KM6235]AND([KW=accounting]OR[KW=account]) | G | | |
| [UID=Taro]AND[Time<12:00] | H | | |
| [UID=Taro]AND[Time≧12:00] | I | | |
| [GID=design]AND[Format=PDF] | J | | |
| [GID=design]AND[Format=JPG] | K | | |
| | | | |

Fig.7

IMAGE FORMING APPARATUS, FILE DELIVERY SYSTEM, AND FILE DELIVERY METHOD THAT MAY EASILY ASSOCIATE A META DATA FILE WITH AN IMAGE DATA FILE IN UNITS OF A PAGE, EASILY CONFIRM THE FINAL PAGE IN THE IMAGE DATA FILE, AND RAPIDLY DELIVER THE IMAGE DATA FILES

INCORPORATION BY REFERENCE

This application is based upon and claims the benefit of priority from corresponding Japanese Patent Application No. 2010-102118, filed in the Japan Patent Office on Apr. 27, 2010, the entire contents of which is incorporated herein by reference.

BACKGROUND

1. Field of the Invention

The present disclosure relates to an image forming apparatus, a file delivery system, and a file delivery method.

2. Description of the Related Art

A typical image forming apparatus adds a meta data file described in Extensible Markup Language (XML) to an image data file that is scanned. The image forming apparatus then transmits the image data file and meta data file over a network to a server. The server is capable of processing the image data file on the basis of the received meta data file.

Such an image forming apparatus is capable of transmitting the image data files in units of a page, and can concurrently scan a document image and transmit the image data file.

However, it is difficult to associate each image data file with the meta data file when the image data files are transmitted in units of the page. In addition, since the image data file corresponding to the final page is confirmed by a timer, the initial processing of the image data files for all the pages is delayed in the server. Furthermore, the addition of the meta data file to each page of the image data file complicates the processing in the image forming apparatus and the server.

SUMMARY

The present disclosure relates to an image forming apparatus, a file delivery system, and a file delivery method that may easily associate a meta data file with an image data file in units of a page, may easily confirm the final page in the image data file, and may rapidly deliver the image data files.

According to an embodiment of the present disclosure, an image forming apparatus connected to a network includes an image scanning unit, a file reception unit, a file delivery unit, a meta data file creating unit, a transmission file name creating unit, and a control unit. The image scanning unit is configured to create an image data file. The file reception unit is configured to receive the image data file from the image scanning unit. The meta data file creating unit is configured to create a first meta data file and a second meta data file. The file delivery unit is configured to transmit the first meta data file, the image data file, and the second meta data file to a file delivery apparatus connected to the network. The transmission file name creating unit is configured to create a transmission file name including a common part among the first meta data file, the image data file, and the second meta data file. The control unit is configured to (1) provide the transmission file name including the common part to the first meta data file corresponding to the image data file, (2) transmit the first meta data file to the file delivery apparatus via the file delivery unit, (3) provide the transmission file name including the common part to the image data file, (4) transmit the image data file to the file delivery apparatus via the file delivery unit, (5) provide the transmission file name including the common part to the second meta data file corresponding to the image data file, and (6) transmit the second meta data file to the file delivery apparatus via the file delivery unit.

According to another embodiment of the present disclosure, a file delivery system includes an image forming apparatus configured to transmit an image data file created by an image scanning unit to a file delivery apparatus via a network. The file delivery apparatus is configured to receive the image data file via the network and deliver the image data file to a terminal apparatus, and the terminal apparatus is configured to receive the image data file via the network. The image forming apparatus includes a meta data file creating unit, a transmission file name creating unit, and a control unit. The meta data file creating unit is configured to create a first meta data file and a second meta data file. The transmission file name creating unit is configured to create a transmission file name including a common part among the first meta data file, the image data file, and the second meta data file. The control unit is configured to (1) provide the transmission file name including the common part to the first meta data file corresponding to the image data file, (2) transmit the first meta data file to the file delivery apparatus, (3) provide the transmission file name including the common part to the image data file, (4) transmit the image data file to the file delivery apparatus, (5) provide a transmission file name including the common part to the second meta data file corresponding to the image data file, and (6) transmit the second meta data file to the file delivery apparatus.

According to yet another embodiment of the present disclosure, a file delivery method includes, utilizing an image forming apparatus connected to a network to create a first meta data file, an image data file, and a second meta data file. A transmission file name including a common part among the first meta data file, the image data file and the second meta data file is then created. The transmission file name including the common part is provided to the first meta data file corresponding to the image data file. The first meta data file is transmitted to a file delivery apparatus connected to the network. The transmission file name including common part is provided to the image data file. The image data file is transmitted to the file delivery apparatus. A transmission file name including the common part is provided to the second meta data file corresponding to the image data file. The second meta data file is transmitted to the file delivery apparatus. The file delivery apparatus receives the first meta data file, the image data file, and the second meta data file from the image forming apparatus, and transmits the image data file to a terminal apparatus connected to the network.

Additional features and advantages are described herein, and will be apparent from the following Detailed Description and the figures.

BRIEF DESCRIPTION OF THE FIGURES

In the accompanying drawings:

FIG. 4 shows a diagram illustrating examples of a pre metadata file and a post metadata file;

FIG. 7 shows a diagram illustrating an example of a delivery condition-delivery destination correspondence table of the image data files.

DETAILED DESCRIPTION

Figure 1:
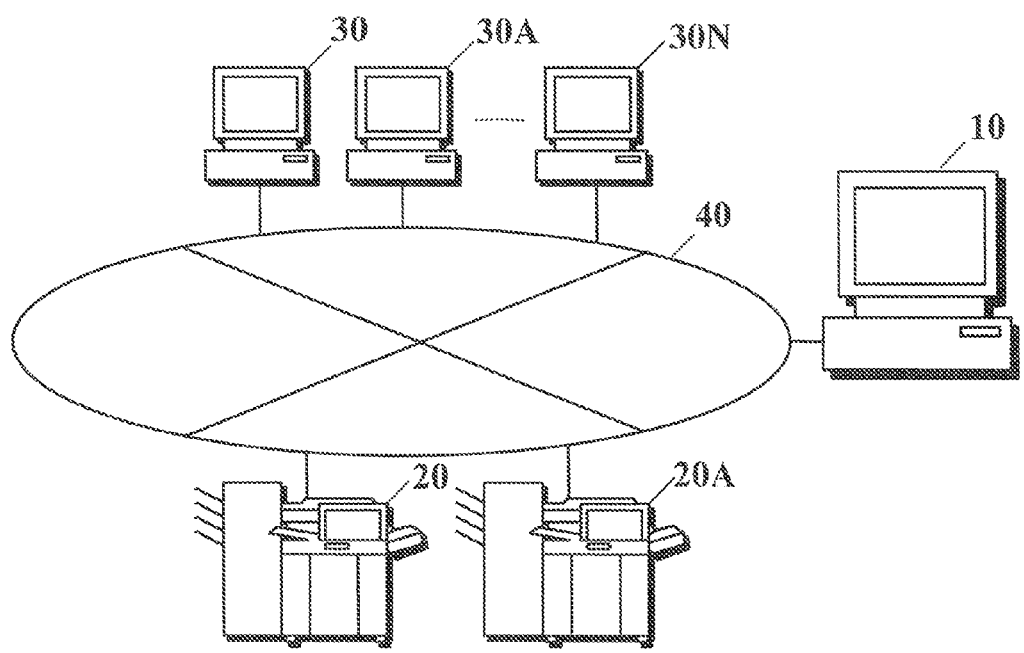
FIG. 1 shows a diagram illustrating an example of a schematic configuration of a file delivery system.

FIG. 1 shows a diagram illustrating an example of a schematic configuration of a file delivery system. Referring to FIG. 1, a file delivery apparatus 10 serving as an intermediary for transmitting image data files is connected to a network 40, along with multi function peripherals (MFPs) 20 and 20A, and terminal apparatuses (PCs) 30 and 30A to 30N. The image data file is transmitted from the MFP 20 and/or 20A to the file delivery apparatus 10, and is transmitted from the file delivery apparatus 10 to one or more destination PCs among the PCs 30 and 30A to 30N. One or more shared folders (not illustrated) are created in at least one of the PCs 30 and 30A to 30N, and the image data file is transmitted to the one or more shared folders.

Figure 2:
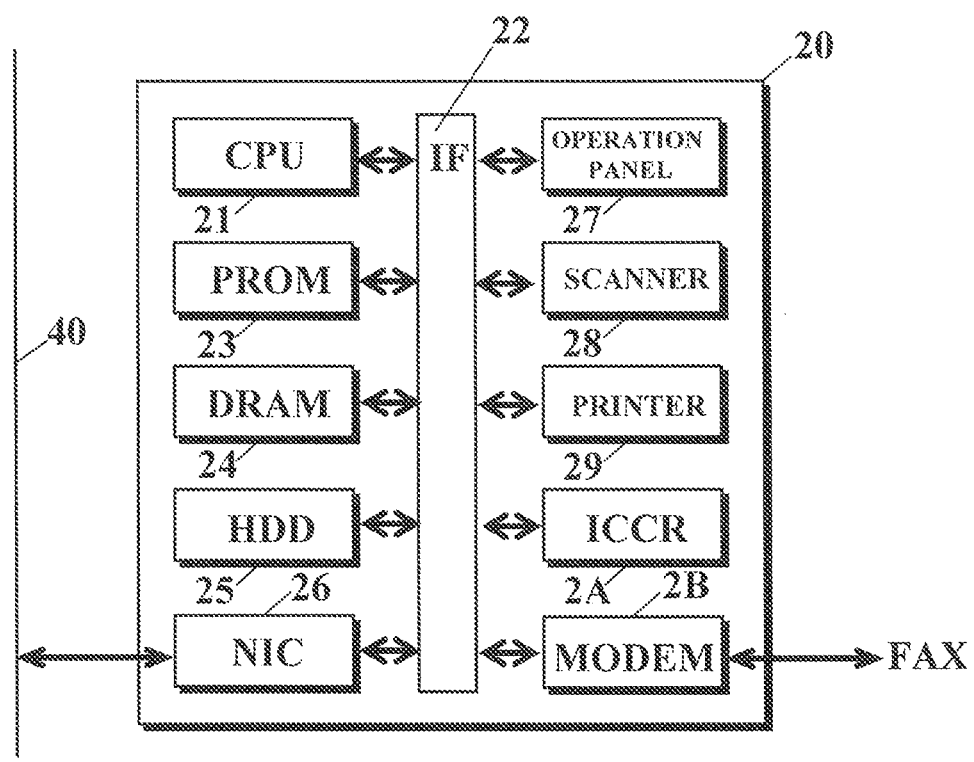
FIG. 2 shows a block diagram illustrating an example of a hardware configuration of an image forming apparatus.

FIG. 2 shows a block diagram illustrating an example of a hardware configuration of the MFP 20 in FIG. 1. The MFP 20A has a configuration that is the same as or similar to the configuration of the MFP 20.

The MFP 20 includes a central processing unit (CPU) 21, a programmable read only memory (PROM) 23, a dynamic random access memory (DRAM) 24, a hard disk drive (HDD) 25, a network interface card (NIC) 26, the operation panel 27, a scanner 28, a printer 29, an integrated circuit (IC) card reader (ICCR) 2A, and a facsimile modem 2B that are connected to an interface (IF) 22. The PROM 23 is, for example, a flash memory, and stores a basic input/output system (BIOS), an OS, and various drivers, along with various applications that cause the MFP 20 to function as an MFP. The applications include a program having a processing flow described below with reference to FIG. 6. The DRAM 24 may be used as a main memory. Print data, image data files scanned by the scanner 28, and facsimile reception data may be stored in the HDD 25. The NIC 26 is connected to the network 40. The operation panel 27 may include keys and a display panel. The scanner 28 is used as an image scanning unit for printing and facsimile transmission and is also used to create the image data files. The printer 29 includes a print engine, a paper feed unit, a sheet conveying unit, and a paper ejecting unit. Bitmap data generated in the DRAM 24 is supplied to the printer 29, an electrostatic latent image is generated on a photoconductive drum on the basis of the bitmap data, the electrostatic latent image is developed with toner, the toner image is transferred on a sheet of paper and is fixed, and the sheet of paper is ejected.

Figure 3:
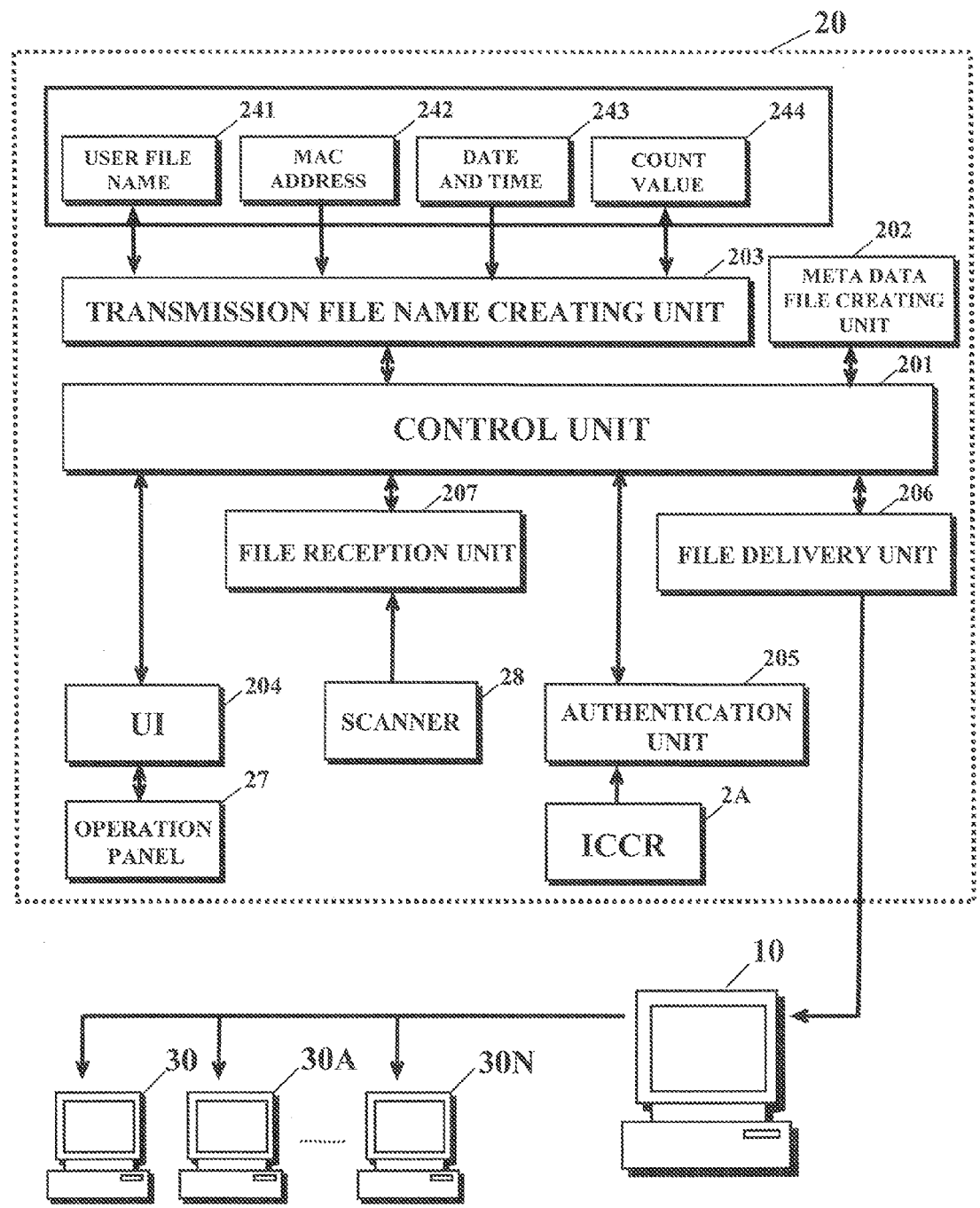
FIG. 3 shows a block diagram illustrating an example of a function configuration of a file delivery system.

FIG. 3 shows a block diagram illustrating an example of a functional configuration of the file delivery system. The MFP 20A has a configuration that is the same as or similar to the configuration of the MFP 20.

Referring to FIG. 3, in the MFP 20, a control unit 201, a metafile creating unit 202, a transmission file name creating unit 203, a user interface 204, an authentication unit 205, a file delivery unit 206, and a file reception unit 207 are composed of software stored in a PROM 23 and a CPU 21 that executes the software.

The control unit 201 provides transmission file names (each including a common part created in the transmission file name creating unit 203) to both the image data file scanned by the scanner 28 and received via the file reception unit 207, and a meta data file created by the metafile creating unit 202.

The control unit 201 transmits the image data file and the meta data file to the file delivery apparatus 10, via the file delivery unit 206. The file delivery apparatus 10 transmits the image data file to the one or more destination PCs among the PC 30 and the PCs 30A to 30N. The control unit 201 displays various input screens in the operation panel 27 and receives the data input through the operation panel 27 via the user interface 204. It should be noted that the file delivery apparatus 10 may transmit the meta data file with the image data file to the one or more destination PCs by data input through an operation panel 27. The control unit 201 sets attribute information including a scanning resolution, a scanning density, a scanning size, and double-sided scanning vs. single-sided scanning in the scanner 28 corresponding to the input data. In addition, the control unit 201 sets a user file name 241 corresponding to the input data.

The transmission file name creating unit 203 creates a transmission file name on the basis of keywords (for example, "consultation", "design", and "accounting" as the user file name 241 in FIG. 5 described below) that are input through the operation panel 27 in the MFP 20, and/or image forming apparatus information of the MFP 20.

The image forming apparatus information of the MFP 20 may include a media access control (MAC) address 242 and/or a model name of the MFP 20, as transmission source identification information on the MFP 20. The image forming apparatus information of the MFP 20 may include a date and time 243, a count value of a job identification (ID) 244, and/or a page number, as job identification information on an image scanning job that is performed by the scanner 28 in the MFP 20.

Additionally, the transmission file name may include a group ID and/or a user ID of a user as user identification information. Furthermore, the transmission file name may include an extension indicating a type of the image data file.

The MAC address read from the NIC 26 may be written in the MAC address 242. The date and time 243 may be updated by the OS in response to an interrupt signal from a timer provided in the CPU of the MFP 20. The date and time 243 may represent the date and time when the image data file is scanned by the scanner 28 or when the image data file is transmitted to the file delivery apparatus 10. The initial value of the job ID 244 may be zero.

The control unit 201 receives the image data files (in units of a page that are scanned by the scanner 28) via the file reception unit 207. The control unit 201 transmits the image data files via the file delivery unit 206. The scanning of the image data files and the transmission and reception of the image data files are concurrently processed to increase the processing speed.

Referring to FIG. 1, when the MFP 20 or 20A transmits the image data files (in units of a page) and the meta data file to the file delivery apparatus 10, the file delivery apparatus 10 may confirm related pages and the range of the pages on the basis of the common part in the transmission file name and the meta data file.

The metafile creating unit 202 in FIG. 3 creates the meta data file including a pre meta data file 2021 and a post meta data file 2022 illustrated in FIG. 4. The control unit 201 transmits the image data files in a unit comprising all the pages (one image scanning job) after transmitting the pre meta data file 2021 to the file delivery apparatus 10, and transmits the post meta data file 2022 after transmitting the image data files in the unit comprising all the pages. The transmission file name including the common part created by the transmission file name creating unit 203 is provided to each of the image data files, the pre meta data file 2021, and the post meta data file 2022.

Referring to FIG. 4, the content of the pre meta data file 2021 and the post meta data file 2022 is described in XML.

The pre meta data file 2021 may include the keywords as the user file name 241 in the transmission file name that are input through the operation panel 27 in the MFP 20, and/or one or more items described irrelevant to the input operation. The one or more items may include a type name, an Internet Protocol (IP) address, the host name, the MAC address 242, and/or the model name of the MFP 20, which are used as the transmission source identification information in the transmission file name. Furthermore, the one or more items may include the group ID and/or the user ID of the user, which are used as the user identification information in the transmission file name.

The post meta data file 2022 may include, for example, the job ID of the image scanning job and/or a state of a result of the image scanning job that are irrelevant to the input operation through the operation panel 27. If the scanner 28 successfully scans all the document images, the state of the result of the image scanning job may be represented as "SCAN_COMPLETED." If the image scanning job is not completed during a predetermined time because an error such as a paper jam occurs during the scanning and forces termination of the image scanning, that kind of error may be represented as the state of the result of the image scanning job.

Figure 5:
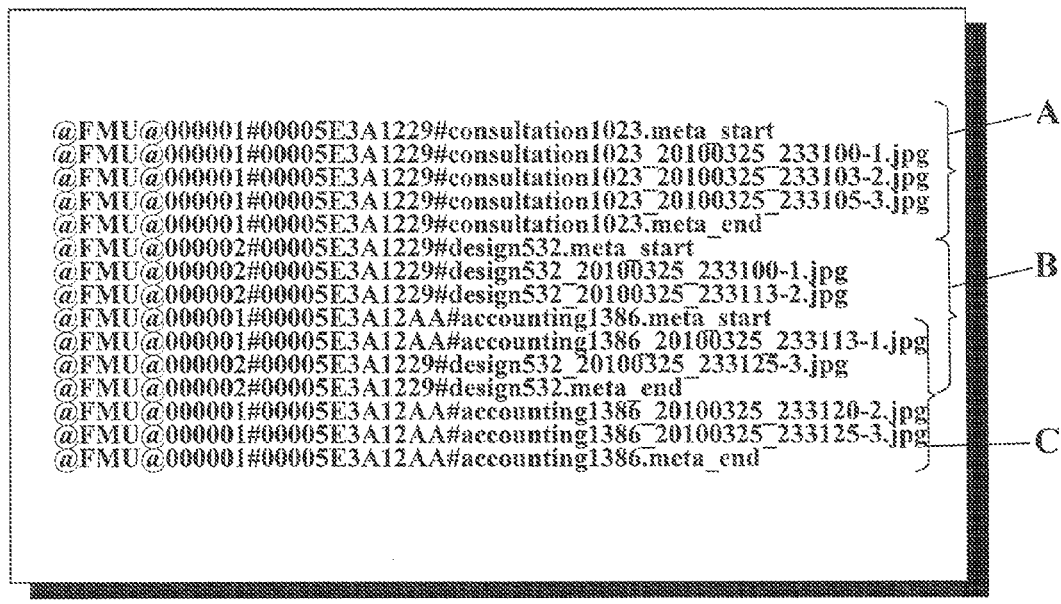
FIG. 5 shows a diagram illustrating transmission file names.

FIG. 5 shows a diagram illustrating the transmission file names of image data files and meta data files received in a file reception folder (not illustrated) in the file delivery apparatus 10. The transmission file names are described in order of reception. FIG. 5 describes the following file-name transmissions: (1) the image data files in the unit comprising all the pages and meta data files of a first job (reference A) received from the MFP 20, (2) the image data files in the unit comprising all the pages and meta data files of a second job (reference B) received from the MFP 20, and (3) the image data files in the unit comprising all the pages and meta data files of a third job (reference C) received from the MFP 20A. Even if the one or more image data files are mixed, the image data files can be identified on the basis of the common part in the transmission file names. The image data files in the unit comprising all the pages (one image scanning job) exist only between the pre meta data file 2021 and the post meta data file 2022 having the common part and the user file name 241 in the transmission file name of the image data file. Accordingly, immediately after the post meta data file 2022 is received, the image data files of all the pages (one image scanning job) can be transmitted to the one or more destination PCs among the PCs 30 and 30A to 30N by the file delivery apparatus 10.

As illustrated in FIG. 5, for example, the transmission file names of the pre meta data file 2021 and the post meta data file 2022 are represented by "@FMU@000001#00005E3A1229#consultation1023.meta_start" and "@FMU@000001#00005E3A1229#consultation1023.meta_end", respectively, and the common part is represented by "@FMU@000001#00005E3A1229#." Symbols "@" and "#" in the common part are represented as delimiters of elements. The element "FMU" represents that the image data file is transmitted from the file delivery apparatus 10. The element "000001" represents the count value of the job ID 244. The element "00005E3A1229" represents the MAC address 242 of the MFP 20. The element "00005E3A12AA" represents the MAC address 242 of the MFP 20A. The element "consultation1023" represents the user file name 241 that is input through the operation panel 27. The count value of the job ID 244 and the MAC address 242 as the common part, and the user file name 241 are included in the transmission file names of the image data file.

An extension "meta_start" represents that the type of the file is the pre meta data file 2021, and an extension "meta_end" represents that the type of the file is the post meta data file 2022.

In the transmission file names of the image data file, the element "20100325$_{13}$ 233100-1" represents the date (Mar. 25, 2010) and time (23:31:00), and the page number (page 1). The element "jpg" represents the extension indicating the type of the image data file.

User authentication information including a user ID and a password is stored in an IC card (not illustrated) possessed by each user. When the IC card is held over the ICCR 2A, the authentication unit 205 reads out the authentication information, compares the readout authentication information with authentication information that is registered, and transmits the authentication result to the control unit 201. The control unit 201 determines whether the image scanning job is performed on the basis of the result of the authentication.

Figure 6:
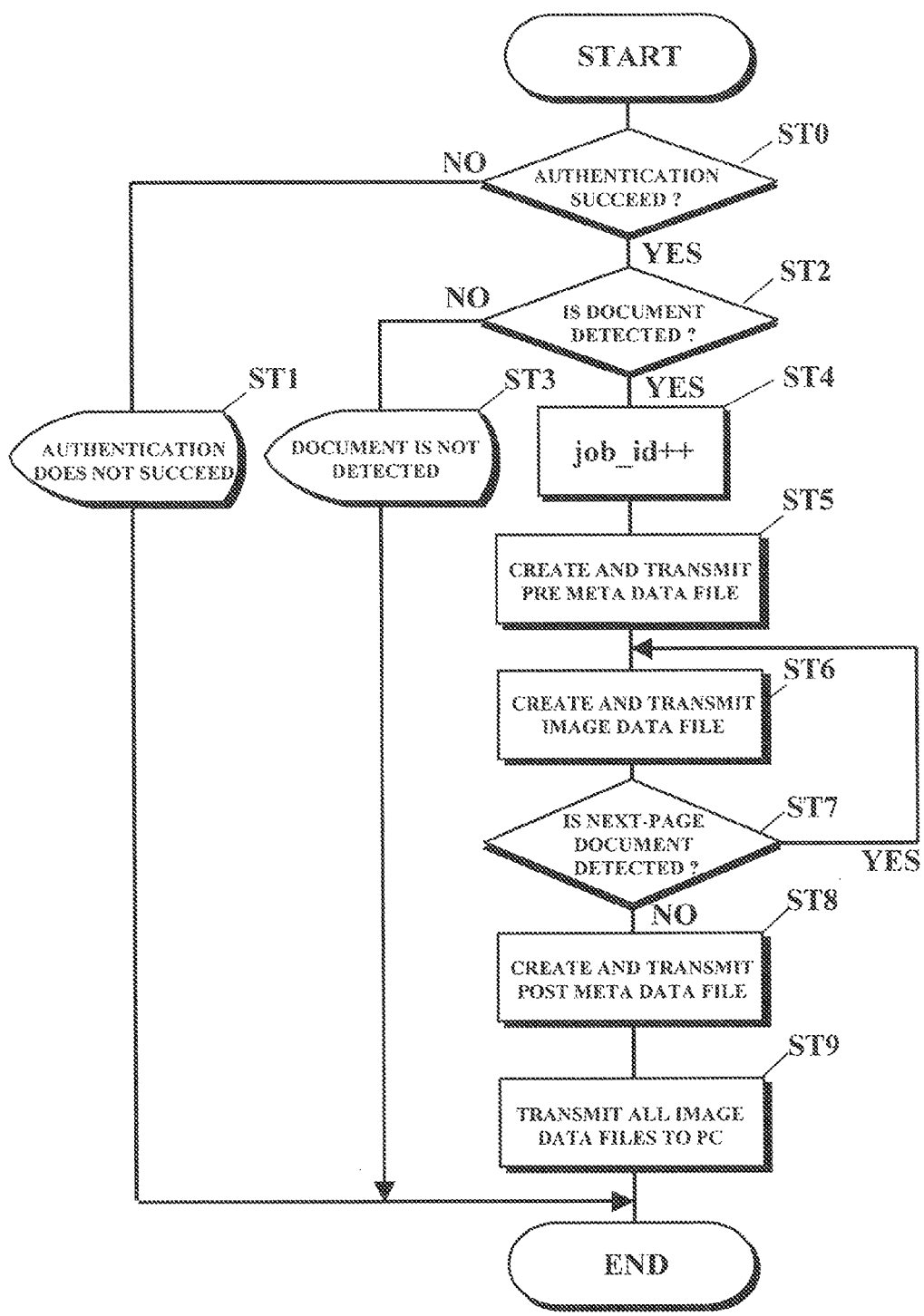
FIG. 6 shows a flowchart illustrating an example of a process of transmitting the image data file by the file delivery system.

FIG. 6 shows a flowchart illustrating an example of a process of transmitting an image data file in the file delivery system. This transmission process is started when the user selects an image scanning function on the operation panel 27 and presses a start button (not illustrated). A job forced termination step when the above error occurs is omitted in FIG. 6.

Referring to FIG. 6, in step ST0, the authentication unit 205 performs authentication. The process goes to step ST2 if the authentication succeeds and the process otherwise goes to step ST1.

In step ST1, the fact that the authentication does not succeed is displayed in the operation panel 27; then, the process of transmitting the image data file in FIG. 6 is terminated.

In step ST2, it is determined whether a document sensor (not illustrated) in the scanner 28 detects a document. The process goes to step ST4 if the document sensor detects the document and the process otherwise goes to step ST3.

In the step ST3, the fact that the document to be scanned is not set is displayed in the operation panel 27 and, then, the process of transmitting the image data file in FIG. 6 is terminated.

In step ST4, the count value of the job ID 244 is incremented by one.

In step ST5, the metafile creating unit 202 creates the pre meta data file 2021. The control unit 201 provides the transmission file name including the common part created by the transmission file name creating unit 203, the user file name 241, and the extension "meta_start" to the pre meta data file 2021. The control unit 201 transmits the pre meta data file 2021 to the file delivery apparatus 10 via the file delivery unit 206. It should be noted that, when the user does not input the user file name 241 through the operation panel 27, the user file name 241 that is set in advance in the MFP 20 may be provided to the pre meta data file 2021.

In step ST6, the control unit 201 provides the transmission file name including the common part and the user file name 241 to the image data file as a unit of the page received via the file reception unit 207 and transmits the image data file (in the unit of the page) to the file delivery apparatus 10 via the file delivery unit 206.

In step ST7, it is determined whether the document sensor detects a next-page document. The process goes back to step ST6 if the document sensor detects the next-page document; otherwise, the process goes to step ST8.

In step ST8, the metafile creating unit 202 creates the post meta data file 2022. The control unit 201 provides the transmission file name including the common part, the user file name 241, and the extension "meta_end" to the post meta data file 2022. The control unit 201 transmits the post meta data file 2022 to the file delivery apparatus 10 via the file delivery unit 206.

In step ST9, immediately after the file delivery apparatus 10 receives the post meta data file, the file delivery apparatus 10 transmits the image data files of all the pages (one image scanning job) to the one or more destination PCs among the PCs 30 and 30A to 30N.

FIG. 7 shows a diagram illustrating an example of the delivery condition-delivery destination correspondence table of the image data files included in the file delivery apparatus 10.

A delivery condition includes a logical expression of related information on the image data file. The file delivery apparatus 10 determines a delivery destination address corresponding to the delivery condition to be the delivery destination addresses (the one or more destination PCs among the PCs 30 and 30A to 30N) of the image data file, if the related information on the image data file meets the logical expression; that is, if a value of the logical expression is "true." The related information on the image data file may include the transmission file name and/or the meta data file. For example, the logical expressions in the delivery conditions in FIG. 7 have the following meanings:

(1) Logical Expression
[KW=consultation]AND[KW=1000-15000]: the value of this logical expression is "true" if "consultation" is included in the keyword (KW) as the user file name 241, a sequential number is included in the KW, and the sequential number is within a range from 1000 to 15000 (if a logical OR in which the number is any of 1000 to 15000 is met).

(2) Logical Expression
[UID=Shizue]AND[KW=purchase order memo]AND[KW=general affairs section]: the value of this logical expression is "true" if the user ID (UID) as the user identification information is "Shizue" and "purchase order memo" and "general affairs section" are included in the KWs.

(3) Logical Expression
[KW=???-???-????]: the value of this logical expression is "true" if arbitrary three-digit, three-digit, and four-digit figures are linked with "-" in the KWs, where "?" represents an arbitrary one-digit numerical values.

(4) Logical Expression
[UID=Hanako]AND[MID=KM6235]AND([KW=accounting]OR[KW=account]): the value of this logical expression is "true", if the UID is "Hanako", the model name (MID) as the transmission source identification information is "KM6235", and "accounting" or "account" is included in the KW.

(5) Logical Expression
[UID=Taro]AND[Time<12:00]: the value of this logical expression is "true" if the UID is "Taro" and the time when the image data file is transmitted to the file delivery apparatus 10 (Time) is before "12:00."

(6) Logical Expression
[UID=Taro]AND[Time≥12:00]: the value of this logical expression is "true" if the UID is "Taro" and the time is at or after "12:00."

(7) Logical Expression
[GID=design]AND[Format=PDF]: the value of this logical expression is "true" if the group ID (GID) as the user identification information is "design" and the file format (Format) as the extension indicating the type of the image data file is "PDF".

The delivery destination addresses A to K in the image data file in FIG. 7 indicate uniform resource identifiers (URIs) of the shared folders in the destination PCs among the PC 30 and the PCs 30A to 30N. For example, A="SMB://192.168.126.162/SCAN/consultation/" and J="Design/."

The use of each of the logical expressions (1) to (4) may cause the delivery destination address corresponding to the type of the content of the image data file to be automatically determined, because the character strings in the transmission file name are included as variables in the logical expressions.

The use of each of the logical expressions (2) and (4) to (7) may cause the delivery destination address corresponding to the user ID or the group ID to be automatically determined even when the content of the image data file is of the same type, because the user ID or the group ID is included as the variables in the logical expressions.

The use of each of the logical expressions (5) and (6) may cause the image data file to be received by the one or more destination PCs during a predetermined period of time when the image data file is transmitted to the file delivery apparatus 10, because the time is included as the variable in the logical expression.

The use of the logical expression (7) may cause the delivery destination address corresponding to the format of the image data file to be automatically determined even when the content of the image data file is of the same type, because the file format is included as the variable in the logical expression.

A method of changing the transmission file name is described in each cell in a file name change column in FIG. 7 when the image data file is transmitted with the transmission file name that is changed. However, a blank cell in the file name change column indicates that the transmission file name is not changed. For example, "purchase order[Count]" may indicate that the transmission file name is changed to the new transmission file name including the element resulting from addition of the element of a value of a software counter [Count] that is incremented by one to the keyword "purchase order" in the transmission file name. "FAX[Now]" may indicate that the transmission file name is changed to the new transmission file name including the element resulting from addition of the element of a current date and time [Now] to the keyword "FAX" in the transmission file name.

A delivery time is described in each cell in a file delivery time column in FIG. 7 when the image data file is delivered at a predetermined time. However, a blank cell in the file delivery time column indicates that the image data file is instantly transmitted. For example, "every day 10:00" may indicate that the image data file is stored in the file reception folder in the file delivery apparatus 10 before 10:00 every day and the image data file is transmitted to the one or more destination PCs at 10:00 every day.

When the related information for one image data file simultaneously meets the delivery conditions in multiple rows in the delivery condition-delivery destination correspondence table in FIG. 7, for example, higher priorities may be provided to the delivery conditions in upper rows. So, the delivery conditions may be sequentially checked from the upper rows, and the delivery condition whose logical expression first becomes "true" may be used. It should be noted that the higher priorities may be provided to the delivery conditions in lower rows. In this case, the delivery conditions are sequentially checked from the upper rows and the delivery condition whose logical expression finally becomes "true" is used. Alternatively, the delivery conditions in all the rows whose logical expression is "true" may be used.

The present disclosure of the embodiment includes various other embodiments. For example, other designs can be used in which the above-described components are each performed.

Although the image data file is transmitted from the MFP 20 or 20A to the shared folders in the one or more destination PCs among the PC 30 and the PCs 30A to 30N by the file delivery apparatus 10 in the above embodiments, the image data file may be transmitted from the MFP 20 and/or 20A to one or more delivery destination folders (not illustrated) in the file delivery apparatus 10.

The file delivery apparatus 10 may be provided with a function that the MFPs 20 and/or 20A are not provided with. For example, the file delivery apparatus 10 may have the function of merging the image data files corresponding to multiple pages into one image data file, and/or the function of embedding the keyword in the meta data file in the header and/or footer of the image data file.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus connected to a network, comprising:
   an image scanning unit configured to create an image data file;
   a file reception unit configured to receive the image data file from the image scanning unit;
   a meta data file creating unit configured to create a first meta data file and a second meta data file;
   a file delivery unit configured to transmit the first meta data file, the image data file, and the second meta data file to a file delivery apparatus connected to the network;
   a transmission file name creating unit configured to create a transmission file name including a common part among the first meta data file, the image data file, and the second meta data file; and
   a control unit configured to (1) provide the transmission file name including the common part to the first meta data file corresponding to the image data file, (2) transmit the first meta data file to the file delivery apparatus via the file delivery unit, (3) provide the transmission file name including the common part to the image data file, (4) transmit the image data file to the file delivery apparatus via the file delivery unit, (5) provide the transmission file name including the common part to the second meta data file corresponding to the image data file, and (6) transmit the second meta data file to the file delivery apparatus via the file delivery unit.

2. The image forming apparatus according to claim 1, wherein the transmission file name includes at least one of job identification information on an image scanning job performed by the image scanning unit and transmission source identification information on the image forming apparatus.

3. The image forming apparatus according to claim 2, wherein the control unit provides the transmission file name to the image data file in a unit comprising all pages of the image scanning job.

4. The image forming apparatus according to claim 2, wherein the job identification information includes at least one of a count value of a job ID, a date and time, and a page number.

5. The image forming apparatus according to claim 2, wherein the transmission source identification information includes at least one of a media access control (MAC) address and a model name.

6. The image forming apparatus according to claim 1, wherein the transmission file name includes a user file name that is input through an operation panel in the image forming apparatus.

7. The image forming apparatus according to claim 1, wherein the transmission file name includes at least one of a group ID and a user ID of a user as user identification information.

8. The image forming apparatus according to claim 1, wherein the transmission file name includes an extension indicating a type of the image data file.

9. The image forming apparatus according to claim 1, wherein the second meta data file includes at least one of a job identification information on an image scanning job performed by the image scanning unit and a state of a result of the image scanning job.

10. The image forming apparatus according to claim 1, wherein the first meta data file includes at least one of transmission source identification information on the image forming apparatus and user information.

11. The image forming apparatus according to claim 10, wherein the transmission source identification information includes at least one of a model name, a type name, an internet protocol (IP) address, a host name, and a MAC address of the image forming apparatus, and the user information includes at least one of a group ID and a user ID.

12. The image forming apparatus according to claim 1, wherein the file delivery apparatus is configured to transmit the image data file to a terminal apparatus connected to the network on the basis of a delivery condition-delivery destination correspondence table of the image data file.

13. The image forming apparatus according to claim 12, wherein a delivery condition in the delivery condition-delivery destination correspondence table includes a logical expression of related information on the image data file, and
wherein the file delivery apparatus is configured to determine that the delivery destination address of the image data file is a delivery destination address corresponding to the delivery condition, if the related information meets the logical expression.

14. The image forming apparatus according to claim 13, wherein the related information on the image data file includes at least one of the transmission file name and the meta data file.

15. A file delivery system comprising:
an image forming apparatus configured to transmit an image data file created by an image scanning unit to a file delivery apparatus via a network;
the file delivery apparatus configured to receive the image data file via the network and deliver the image data file to a terminal apparatus; and
the terminal apparatus configured to receive the image data file via the network, wherein the image forming apparatus includes
- a meta data file creating unit configured to create a first meta data file and a second meta data file;
- a transmission file name creating unit configured to create a transmission file name including a common part among the first meta data file, the image data file, and the second meta data file; and
- a control unit configured to (1) provide the transmission file name including the common part to the first meta data file corresponding to the image data file, (2) transmit the first meta data file to the file delivery apparatus, (3) provide the transmission file name including the common part to the image data file, (4) transmit the image data file to the file delivery apparatus, (5) provide a transmission file name including the common part to the second meta data file corresponding to the image data file, and (6) transmit the second meta data file to the file delivery apparatus.

16. The file delivery system according to claim 15, wherein the transmission file name includes at least one of job identification information on an image scanning job that is performed by the image scanning unit and transmission source identification information on the image forming apparatus from which the image data file is transmitted.

17. The file delivery system according to claim 15, wherein the control unit provides the transmission file name to the image data file in a unit comprising all pages of the image scanning job.

18. A file delivery method comprising:
via an image forming apparatus connected to a network,
- creating a first meta data file, an image data file, and a second meta data file,
- creating a transmission file name including a common part among the first meta data file, the image data file and the second meta data file,
- providing the transmission file name including the common part to the first meta data file corresponding to the image data file,
- transmitting the first meta data file to a file delivery apparatus connected to the network,
- providing the transmission file name including common part to the image data file,
- transmitting the image data file to the file delivery apparatus,
- providing the transmission file name including the common part to the second meta data file corresponding to the image data file, and
- transmitting the second meta data file to the file delivery apparatus; and via the file delivery apparatus,
- receiving the first meta data file, the image data file, and the second meta data file from the image forming apparatus, and
- transmitting the image data file to a terminal apparatus connected the network.

19. The file delivery method according to claim 18, wherein the common part includes job identification information on an image scanning job of an image scanning job performed by the image scanning unit, and source identification information on the image forming apparatus.

20. The file delivery method according to claim 18, wherein providing the transmission file name to the image data file comprises transmitting the file name in a unit comprising all pages of the image scanning job.

* * * * *